B. C. SABIN.
PIE PAN.
APPLICATION FILED JUNE 7, 1913.

1,097,367. Patented May 19, 1914.

Witnesses
T. P. Britt
E. C. Duffy

Inventor
Beele C. Sabin
By
Attorneys

UNITED STATES PATENT OFFICE.

BELLE C. SABIN, OF CHICAGO, ILLINOIS.

PIE-PAN.

1,097,367.

Specification of Letters Patent.

Patented May 19, 1914.

Application filed June 7, 1913. Serial No. 772,344.

*To all whom it may concern:*

Be it known that I, BELLE C. SABIN, a citizen of the United States, residing at Chicago, in the county of Cook and State of Illinois, have invented certain new and useful Improvements in Pie-Pans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to pie pans and has for its object to provide a combined pie pan and a removable crust holding and engaging ring by means of which the crust of the pie is securely held in proper position on the pan during the baking of the pie.

A further object of the invention is to provide the pie pan with an annular trough around the outer edge of the pan so constructed and arranged as to receive juices which frequently emanate from the ingredients of the pie, the purpose of the trough being to prevent the running of the said juices out of the pan onto the stove.

With these objects in view the invention consists in the novel construction of the pie pan and in combination with the removable ring as will be hereinafter fully described and afterward pointed out in the appended claims.

Figure 1:
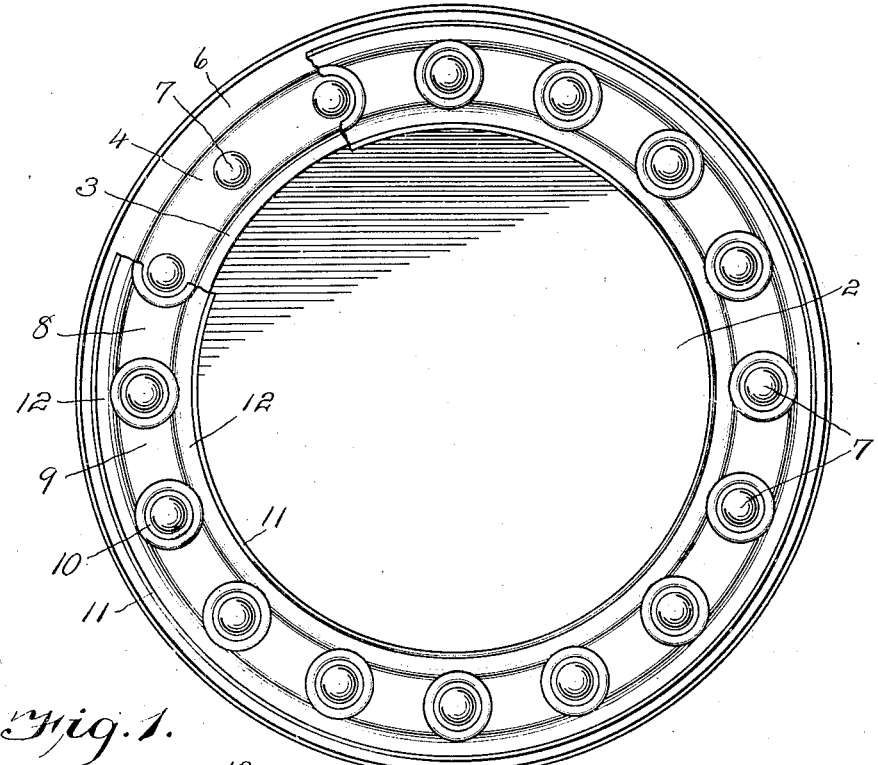
Figure 2:
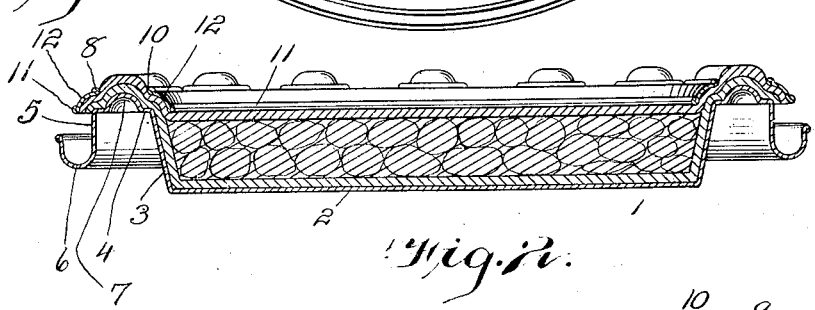
Figure 3:
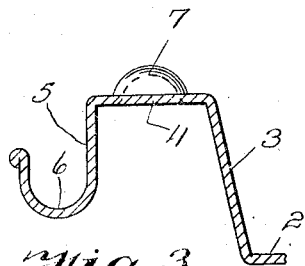
Figure 4:
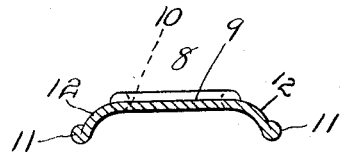

Referring to the accompanying drawing: Figure 1 is a plan view of a pie pan illustrating the removable ring applied thereto, a section of the removable ring being cut away in order to facilitate illustration. Fig. 2 is a vertical sectional view through the pie pan and ring. Fig. 3 is a fragmentary vertical sectional view through the outer portion of the pie pan, and Fig. 4 is a vertical sectional view through the removable ring.

Like numerals of reference indicate the same parts throughout the several figures in which;

1 indicates the pie pan having the flat bottom 2, side walls 3, flat rim 4, annular depending wall 5 and trough 6, the said flat rim 4 being provided at intervals with round projecting buttons 7 preferably punched in the flat rim 4.

8 indicates the removable ring which comprises the flat portion 9 having therein at intervals openings 10 registering with and corresponding with the round beads or buttons 7 on the surface 4 of the pie pan. It will be seen from Fig. 4 that the metal of the ring 8 surrounding the annular openings 10 is raised above the surface of the flat portion 9, while the edges of the ring 8 are beaded at 11 in order to present to the crust of the pie a regular round surface to prevent cutting of the crust.

As will appear from Fig. 2 the edge portions 12 of the ring 8 are bent downwardly to conform to the pie crust on the annular wall 3 of the pan and to cause the extreme edges of the pie crust to depend or follow the annular wall 5 which forms the trough 6.

Having thus described the several parts of this invention the operation is as follows: The pie crust ingredients of the pie being placed in position shown in Fig. 2, the said pie crust, both upper and lower are extended over the beaded surface 4 of the pie pan. When in this position the removable ring 8 is placed in position shown in Fig. 2 and operates in such manner that the upper and lower crusts of the pie are forced up through the openings 10 in the removable ring 8, said upper and lower crusts of the pie following the contour of the beads 7 on the portion 4 of the pie pan. It will further be seen that upon the application of the removable ring 8 to the pie crust that that portion of the two crusts at the annular wall 3 of the pie pan will be forced into shape and position illustrated in Fig. 1, while the extreme outer edges of the two crusts will be caused to follow the direction of the vertical wall 5 which forms the trough 6 and in this manner a perfect union between the crusts is effected.

By reason of the raised and beaded construction of the removable ring 8 the crust is not cut or damaged by the application of the ring and the ring is susceptible to the quick and ready removal from the pie crust after the pie is removed from the stove.

Having thus described the operation of the invention it is of course apparent that certain changes and alterations can be made which would fall within the limit and scope of this invention, and I consider myself clearly entitled to all such changes and al- terations as fall within the terms of the following claims.

What I claim as new and desire to secure by Letters Patent of the United States is:—

1. A combined pie pan and ring, the pie pan having an annular wall and flat surface to receive the crust of the pie, said flat surface being provided at intervals with a series of beads extending above the normal surface of the metal, a depending wall formed on the flat beaded surface, a trough formed by said wall, a removable ring having a flat surface to conform to the said flat surface of the pan and provided at intervals with a plurality of openings to register with the beads on the said flat surface of the pan in such manner that the crusts of the pie will be forced through the said annular openings in the removable ring by the said beads on the pan upon application of the said ring thereto, the edge portions of the said removable ring being curved downwardly to conform to the said annular walls of the said pan, the metal of the said ring surrounding the said annular openings therein being raised and beaded above the normal surface of the ring to prevent injury to the pie crust upon application of the ring to the above, substantially as described and for the purposes set forth.

2. A combined pie pan and ring, the pie pan having an annular wall and flat surface to receive the crust of the pie, said flat surface being provided at intervals with a series of beads extending above the normal surface of the metal, a depending wall formed on the flat beaded surface, a trough formed by said wall, a removable ring having a flat surface to conform to the said flat surface of the pan and provided at intervals with a plurality of openings to register with the beads on the said flat surface of the pan in such manner that the crusts of the pie will be forced through the said annular openings in the removable ring by the said beads on the pan upon application of the said ring thereto, the edge portions of the said removable ring being curved downwardly to conform to the said annular walls of the said pan.

In testimony whereof, I affix my signature, in presence of two witnesses.

BELLE C. SABIN.

Witnesses:
   IDA B. HUDDLE,
   HARRIET C. DAVIS.